(12) United States Patent
Guday et al.

(10) Patent No.: US 11,595,809 B2
(45) Date of Patent: *Feb. 28, 2023

(54) ESIM PROFILE DISCOVERY

(71) Applicant: Microsoft Technology Licensing, LLC, Redmond, WA (US)

(72) Inventors: Shai Guday, Redmond, WA (US); Jeffrey J. Malvern, Kirkland, WA (US); John David Bruner, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,636

(22) Filed: Apr. 7, 2020

(65) Prior Publication Data

US 2020/0236530 A1    Jul. 23, 2020

Related U.S. Application Data

(63) Continuation of application No. 16/189,446, filed on Nov. 13, 2018, now Pat. No. 10,652,728.

(51) Int. Cl.
*H04W 12/06*    (2021.01)
*H04W 4/70*    (2018.01)
*H04W 8/18*    (2009.01)
*H04W 4/80*    (2018.01)
*H04W 48/16*    (2009.01)

(52) U.S. Cl.
CPC ............ *H04W 8/183* (2013.01); *H04W 4/70* (2018.02); *H04W 4/80* (2018.02); *H04W 8/186* (2013.01); *H04W 12/06* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 9,998,896 B1* | 6/2018 | Guven | .................... H04L 61/20 |
| 10,314,072 B2* | 6/2019 | Loehr | ............... H04W 72/1284 |
| 2010/0098011 A1* | 4/2010 | Pelletier | ............ H04W 28/0278 |
| | | | 370/329 |

(Continued)

OTHER PUBLICATIONS

"Notice of Allowance Issued in U.S. Appl. No. 16/189,446", dated Jan. 8, 2020, 10 Pages.

(Continued)

*Primary Examiner* — Sai Aung
(74) *Attorney, Agent, or Firm* — Han Gim; Newport IP, LLC (57) ABSTRACT

Mobile devices are provisioned that do not have a direct communications path to a data network. A proximate device is discovered that is available for connecting to the mobile device via a peer-to-peer connection. The proximate device is determined to be trusted by the mobile device and usable to communicate to the data network A peer-to-peer connection is established with the proximate device. Identification data is provided to the proximate device, and an activation code is received. The mobile device communicates to the mobile network operator indicated by the activation code. Subscription credentials are received for accessing a mobile network operated by the mobile network operator.

20 Claims, 8 Drawing Sheets

(56) References Cited

U.S. PATENT DOCUMENTS

| | | | |
|---|---|---|---|
| 2012/0317204 A1* | 12/2012 | Lazaridis | H04L 63/0846 709/205 |
| 2013/0163535 A1* | 6/2013 | Anderson | H04L 1/0072 370/329 |
| 2013/0229944 A1* | 9/2013 | Montemurro | H04W 8/005 370/254 |
| 2013/0273850 A1* | 10/2013 | Kim | H04W 76/30 455/41.2 |
| 2013/0273855 A1* | 10/2013 | Cherian | H04W 4/02 455/68 |
| 2014/0036737 A1* | 2/2014 | Ekpenyong | H04W 8/245 370/328 |
| 2015/0067351 A1* | 3/2015 | Wang | H04W 12/126 713/189 |
| 2017/0041773 A1 | 2/2017 | Fujishiro et al. | |
| 2017/0055164 A1 | 2/2017 | Santhanam et al. | |
| 2017/0171898 A1* | 6/2017 | Jamal-Syed | H04W 8/005 |
| 2017/0303240 A1 | 10/2017 | Basu mallick et al. | |
| 2018/0060199 A1 | 3/2018 | Li et al. | |
| 2018/0288560 A1 | 10/2018 | Naik et al. | |
| 2019/0159018 A1 | 5/2019 | Basu mallick et al. | |
| 2019/0174449 A1 | 6/2019 | Shan et al. | |

OTHER PUBLICATIONS

"International Search Report and Written Opinion Issued in PCT Application No. PCT/US2019/059572", dated Feb. 3, 2020, 16 Pages.

"Office Action Issued in Indian Patent Application No. 202147021165", dated Dec. 30, 2022, 6 Pages.

\* cited by examiner

ESIM PROFILE DISCOVERY

PRIORITY INFORMATION

This application claims the benefit of and priority to U.S. patent application Ser. No. 16/189,446, filed Nov. 13, 2018, and entitled "ESIM PROFILE DISCOVERY," the entire contents of which are incorporated herein by reference.

BACKGROUND

Service providers for communications devices generally require that the communications device have the proper credentials to access and enable use of services. The credentials securely and uniquely identify a subscription or account with the service provider and enable the communications device to access and use the services associated with the subscription. When the communications device is a mobile communications device, the service provider may be called a mobile network operator (MNO), and the services may include, for example, mobile voice calling, text messaging, or internet data service.

The credentials may reside in a secure container called a Universal Integrated Circuit Card (UICC) or "SIM card." The UICC may be embedded in the communications device, in which case it may be called an embedded UICC (eUICC) or an eSIM. The credentials may be provisioned to the UICC or eUICC/eSIM when manufactured or may be provisioned to the UICC or eUICC/eSIM remotely while the UICC or eUICC/eSIM resides in the communications device.

An eSIM-capable device (e.g., an Always Connected PC) may ship with an empty eSIM. In order to use cellular connectivity, the device must connect to a specific remote server (SM-DP+) to download an eSIM profile (i.e., the mobile operator credentials needed to use the cellular modem).

If the device has some form of local Internet connectivity (such as WiFi), then as per the industry-accepted GSMA specification it can interrogate a global discovery server (SM-DS) to obtain the necessary contact information for the download server. However, in some cases, the device may not be able to connect directly to the Internet. Further, some mobile operators may not use the global discovery server.

It is with respect to these considerations and others that the disclosure made herein is presented.

SUMMARY

The disclosed embodiments describe technologies for allowing an unprovisioned eSIM-capable device to determine the eSIM download server (e.g., the SM-DP+) it needs to contact in order to provision its eSIM, and to connect to that server, even when the device has no direct means of accessing the internet such as Wifi. In some embodiments, the device may be associated with an entity such as an enterprise or an IoT solution. In one example scenario, it is desirable for enterprises to configure their mobile devices automatically connected and configured per enterprise specifications when the devices are turned on. If connectivity is available, then the device may be enrolled via enterprise processes and enterprise images may be downloaded in accordance with enterprise policies and specifications. However, if the device is turned on in an area where there is no Wifi, the device may not be able to use over-the-air connectivity via a mobile carrier because the device has not yet been provisioned for such services. Thus without any means to connect (e.g., via Wifi), the device will not be provisioned until the device can be moved to another location that has Wifi or other connectivity means, such as to a Wifi hotspot or to an enterprise location. The described embodiments describe techniques for enabling the provisioning of a device under such circumstances, where there is no other connectivity for an enterprise device that is eSIM-capable but has not yet been provisioned.

In addition to scenarios where an entity such as enterprise is managing the provisioning of their devices, in other embodiments, the methods and systems may be implemented in the context of a device or a group of devices such as in an Internet of Things (IoT) scenario where a headless device needs to be provisioned for connectivity.

The present disclosure provides a way for a device to be identified and obtain the information it needs to identify to the correct SM-DP+ via a secure local pairing of the device with a proximate device that is known and managed by the entity or otherwise has an established level of trust within a system or network. In this way, an unprovisioned device may be able to determine its eSIM download server (SM-DP+) using the proximate trusted device via the mobile network. The unprovisioned device may then connect to the SM-DP+ using the connectivity of the proximate device.

The GSMA eSIM specification describes a way for a device such as a smartphone that is activating a companion device (such as a smart watch) to contact an operator web server associated with the smartphone. However, in that case, the provisioning information is stored on the smartphone's SIM card under control of its mobile operator, and the configured information on the smartphone's SIM is used to start a provisioning session on the smartphone itself. However, there is no mechanism by which this information can be provided by an alternative entity such as an enterprise. The disclosed embodiments describe ways that an eSIM-capable device may itself access provisioning information via another device that is already known and trusted. For example, the eSIM-capable device may establish a connection with a smartphone that is managed by the enterprise and use the smartphone to access the mobile network. While the present disclosure describes embodiments in the context of a mobile device such as a smartphone managed by an enterprise, the described techniques may be implemented for activation of other unprovisioned devices such as IoT devices that have not been provisioned and which do not have direct access to the Internet.

In an embodiment, the trusted enterprise device may provisionally pair with the eSIM-capable device and relay traffic from the eSIM-capable device to the Internet. The trusted enterprise device may provisionally pair with the eSIM-capable device using a pairing process that may be assisted and secured by information provided by an entity such as an enterprise. For example, the eSIM-capable device may expose a unique identifier in a way that is easily retrieved by the proximate device, such as a QR code that the proximate device can scan. The identity can then be confirmed with the enterprise or other management entity. In some embodiments, applications may be installed on the eSIM-capable device and trusted enterprise device that are configured to assist in the authentication and secure pairing. In some embodiments, an application installed on the trusted enterprise device may be configured to receive information that is indicative of the unique identity of the eSIM-capable device. For example, the application may be configured to cause the trusted enterprise device to read or scan a QR code or other readable code that is provided by the eSIM-capable device. The trusted enterprise device may send the identification data to the enterprise, such as to an enterprise service that is configured to receive the identification information and verify that the eSIM-capable device is an enterprise device. The enterprise service may also verify what type of subscription that the eSIM-capable device should have. The enterprise service may issue a token to the eSIM-capable device that may be used to obtain the assigned subscription credentials from the mobile operator. The enterprise service may also send data to the eSIM-capable device such as the location of the mobile network operator server. Collectively, this server address and token may be called an "activation code". The trusted enterprise device may receive verification from the enterprise service that the eSIM-capable device has been verified. The trusted enterprise device may allow the eSIM-capable device to access the Internet via its peer connection. The eSIM-capable device may use this access to communicate with the mobile network operator, present the received token that identifies the eSIM-capable device, and receive its provisioning information.

Further embodiments are disclosed for determining the profile to be downloaded to the eSIM-capable device. In one embodiment, the identity of the device and its eUICC may be recorded in advance (e.g., at manufacture) and an eSIM profile may be pre-allocated for that device. In one embodiment, the eSIM-capable device may use the trusted enterprise device as a bridge to the Internet and contact a discovery service (SM-DS or "default SM-DP+"). In another embodiment, the trusted enterprise device may be pre-configured with the download server associated with the entity (enterprise), and may provide this information to the eSIM-capable device. In another embodiment, an eUICC profile may be allocated when the eSIM-capable device is activated. In this case, the eSIM-capable device may interact with the managing entity (enterprise) and connect through the trusted enterprise device, resulting in the delivery of a server address and token pair (the activation code) to the eSIM-capable device.

In an embodiment, download and installation of the profile may be implemented using the trusted enterprise device as a bridge to the Internet. The connection may be routed and secured with the assistance of the managing entity. For example, the trusted enterprise device may have a VPN or other secure connection that it provides based upon the secure pairing to the eSIM-capable device.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION OF ILLUSTRATIVE EMBODIMENTS

A device that is capable of communicating on a mobile network but is not yet provisioned to do so typically obtains its provisioning information by accessing the internet via means other than the mobile network, such as a Wifi internet connection. However, when alternate means to access the internet are not available, the device will not be able to obtain its credentials until the device is able to access the internet. Once it is connected, the device may need to determine the information that describes the credentials to be provisioned, such as the activation code for an eSIM profile. The GSMA eSIM specification defines a way for a device to determine this provisioning information using a global discovery server (e.g., the SM-DS). However, many mobile operators do not use the SM-DS. Additionally, the device may not have access to the internet or other means to access the SM-DS aside from using the mobile network, which it cannot do because it is not yet provisioned.

Described herein are methods and systems that allow an entity or device to find the eSIM download server (e.g., the SM-DP+) it needs to contact in order to provision its eSIM, and to communicate with that server, even when the device has no direct means of accessing the internet. The entity may be an organization such as an enterprise. In other embodiments, the methods and systems may be implemented in the context of a single device or a group of devices. The present disclosure provides an alternative way for an entity or device to identify and connect to the correct SM-DP+ using a proximate device that is known and managed by the entity or otherwise has an established level of trust. In this way, a new device may be able to determine its eSIM download server (SM-DP+) using the proximate trusted device via the mobile network.

While the GSMA eSIM specification describes a way for a smartphone that is activating a companion device (such as a smart watch) to contact an operator web server associated with the smartphone, the provisioning information is stored on the smartphone's SIM card under control of its mobile operator, and the configured information on the smartphone's SIM is used to start a provisioning session on the smartphone and not the companion device.

In various embodiments, an eSIM-capable device may access provisioning information via another device that is known and trusted. For example, the eSIM-capable device may connect to a smartphone that is managed by the enterprise to access the mobile network. While the present disclosure describes embodiments in the context of a mobile device such as a smartphone managed by an enterprise, the described techniques may be implemented in various settings where a device that is eSIM-capable is unable to be activated on a mobile network because it does not have its own direct means of accessing the Internet in order to obtain its mobile operator subscription information. Such settings and scenarios may include, for example, an unprovisioned device in an IoT network that can establish a peering connection to another device in the IoT network.

In an embodiment, the trusted enterprise device may pair with the eSIM-capable device and relay traffic from the eSIM-capable device to the Internet. For example, the eSIM-capable device may connect via Bluetooth or other peering methods to a trusted enterprise smartphone, which may use its cellular connection to relay information to the Internet. The pairing process between the trusted enterprise device and the eSIM-capable device may be facilitated and secured in part based on the relationship of the eSIM-capable device and the trusted enterprise device to the same entity (enterprise).

In one embodiment, the trusted enterprise device may contain a configurable string whose value is the fully-qualified domain name of the eSIM download server of the mobile operator used by the enterprise. For example, the configurable string may be "eSIM server name." The enterprise may configure the eSIM server name as part of its management of the trusted enterprise device (e.g., using an MDM such as Intune). When the eSIM-capable device pairs with the trusted enterprise device, the trusted enterprise device may send the eSIM server name to the eSIM-capable device. The eSIM-capable device may then connect (through the trusted enterprise device) to the download server specified by the eSIM server name to obtain its eSIM profile. In another embodiment, the eSIM-capable device may use the trusted enterprise device to obtain the complete identification of the subscription to be downloaded (the activation code of the eSIM profile) from the enterprise.

The techniques described herein may be implemented for devices in communication with various wireless communications systems such as CDMA, TDMA, FDMA, OFDMA, and SC-FDMA. A CDMA system may implement a radio technology such as CDMA2000, Universal Terrestrial Radio Access (UTRA), etc. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. The techniques described herein may be used for the systems and radio technologies mentioned above as well as other systems and radio technologies. The description below, however, describes a cellular system for purposes of example, although the techniques are applicable beyond cellular applications.

Figure 1:
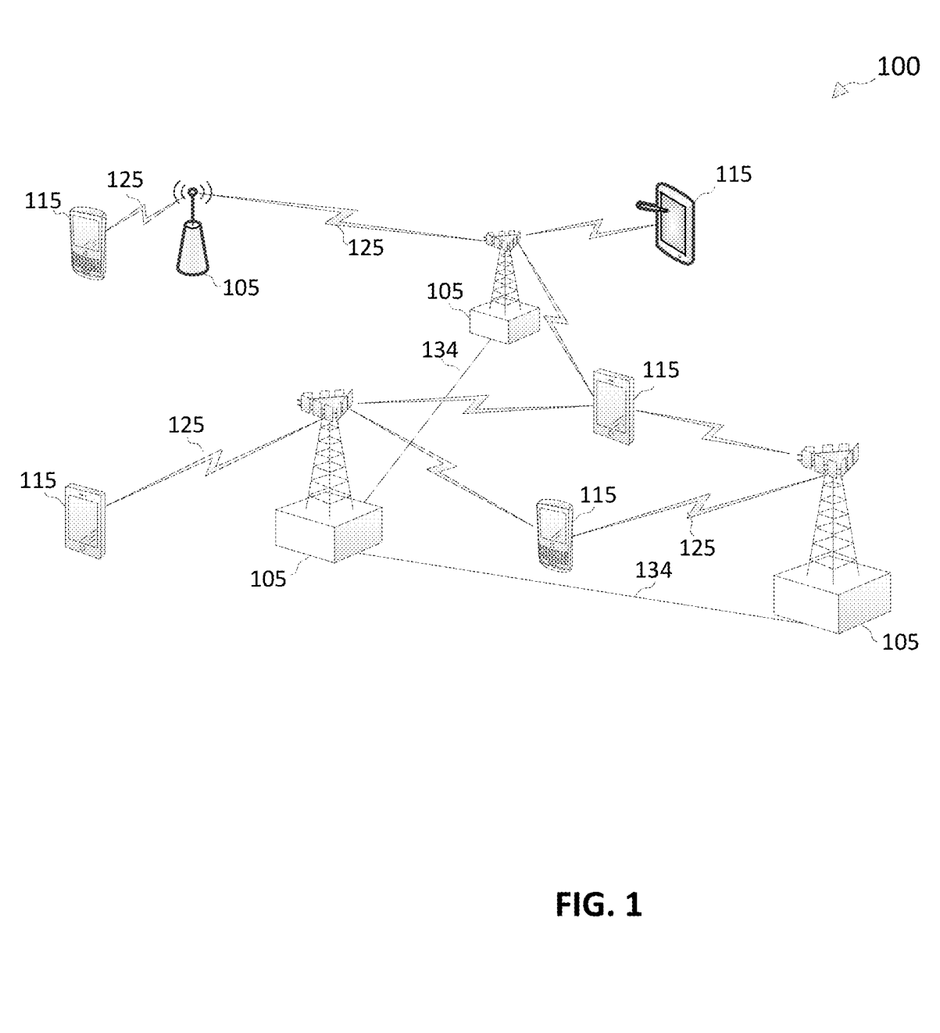
FIG. 1 depicts an example of a networked environment where aspects of the disclosure may be implemented.

FIG. 1 is a block diagram conceptually illustrating an example of a wireless communications system 100, in accordance with an aspect of the present disclosure. The wireless communications system 100 includes base stations (or cells) 105 and mobile devices 115. The base stations 105 may communicate with the mobile devices 115 under the control of a base station controller (not shown), which may be part of a core network or the base stations 105. The wireless communications system 100 may support operation on multiple carriers. Multi-carrier transmitters can transmit modulated signals simultaneously on the multiple carriers. For example, each communication link 125 may be a multi-carrier signal modulated according to the various radio technologies described above.

The base stations 105 may wirelessly communicate with the mobile devices 115 via one or more base station antennas. The base stations 105 sites may provide communication coverage for respective coverage areas. The mobile devices 115 may be located throughout the wireless communications system 100 and may be stationary or mobile. A mobile device 115 may also be referred to as user equipment (UE), mobile station, a mobile unit, a subscriber unit, remote unit, a mobile device, a wireless communications device, a remote device, a mobile terminal, a wireless terminal, a handset, a mobile client, a client, or other suitable terminology. A mobile device 115 may be a cellular phone, a wireless modem, a wireless communication device, a handheld device, a tablet computer, a laptop computer, or the like. The communication links 125 shown in the wireless communications system 100 may include uplink (UL) transmissions from a mobile device 115 to a base station 105, and/or downlink (DL) transmissions, from a base station 105 to a mobile device 115.

Figure 2:
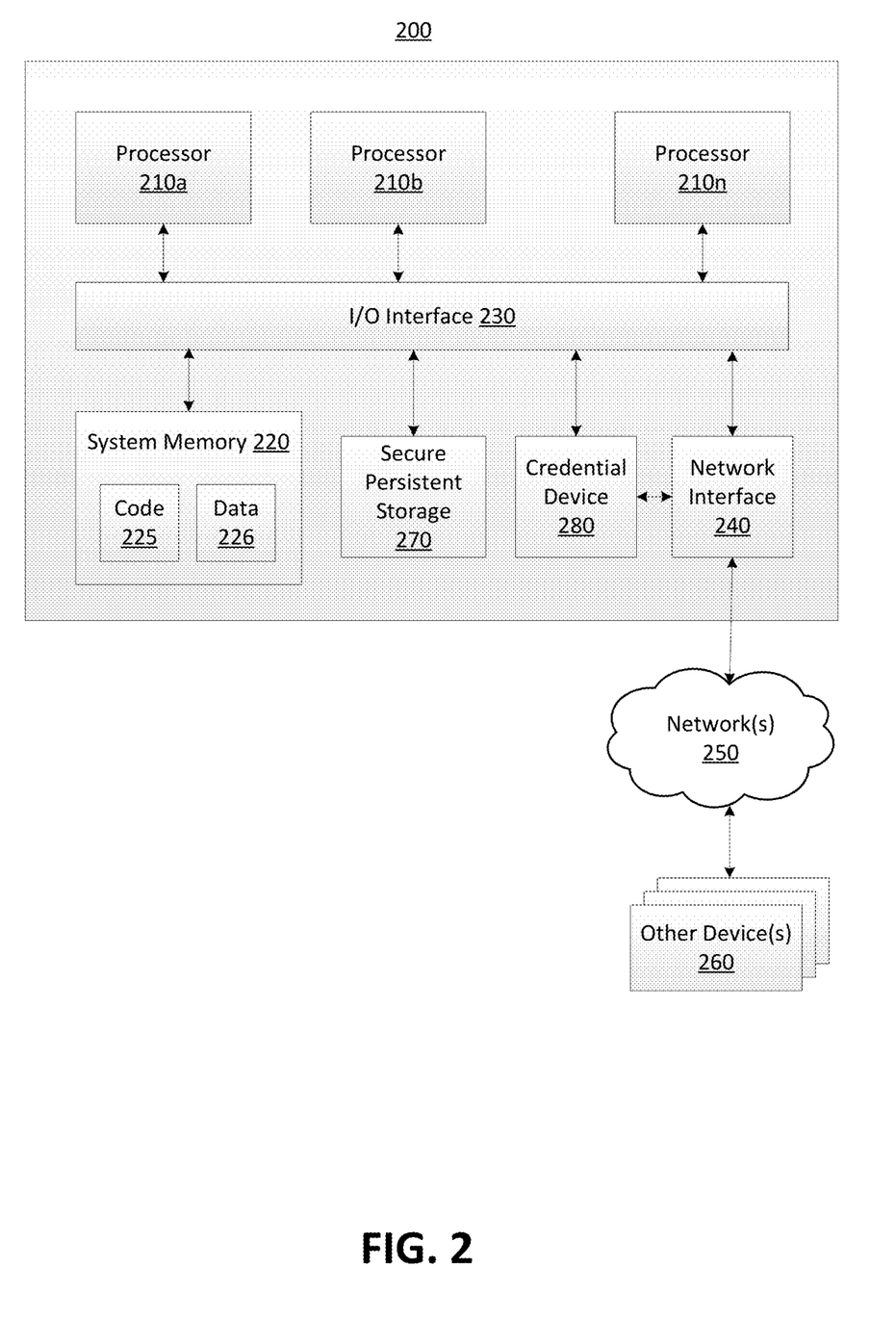
FIG. 2 depicts an example of a computing device where aspects of the disclosure may be implemented.

In at least some embodiments, a computing device that implements a portion or all of one or more of the technologies described herein may include a general-purpose computer system that includes or is configured to access one or more computer-accessible media. FIG. 2 illustrates such a general-purpose computing device 200. In the illustrated embodiment, computing device 200 includes one or more processors 210a, 210b, and/or 210n (which may be referred herein singularly as "a processor 210" or in the plural as "the processors 210") coupled to a system memory 220 via an input/output (I/O) interface 230. Computing device 200 further includes a network interface 240 coupled to I/O interface 230.

In various embodiments, computing device 200 may be a uniprocessor system including one processor 210 or a multiprocessor system including several processors 210 (e.g., two, four, eight, or another suitable number). Processors 210 may be any suitable processors capable of executing instructions. For example, in various embodiments, processors 210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 210 may commonly, but not necessarily, implement the same ISA.

System memory 220 may be configured to store instructions and data accessible by processor(s) 210. In various embodiments, system memory 220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 220 as code 225 and data 226. In various embodiments, secure persistent storage 270 may be present, either within System Memory 220 or separate from it, to hold non-volatile privacy-sensitive information.

In one embodiment, I/O interface 230 may be configured to coordinate I/O traffic between processor 210, system memory 220, and any peripheral devices in the device, including network interface 240 or other peripheral interfaces. In some embodiments, I/O interface 230 may perform any necessary protocol, timing, or other data transformations to convert data signals from one component (e.g., system memory 220) into a format suitable for use by another component (e.g., processor 210). In some embodiments, I/O interface 230 may include support for devices attached through various types of peripheral buses, such as a variant of the Peripheral Component Interconnect (PCI) bus standard or the Universal Serial Bus (USB) standard, for example. In some embodiments, the function of I/O interface 230 may be split into two or more separate components, such as a north bridge and a south bridge, for example. Also, in some embodiments some or all of the functionality of I/O interface 230, such as an interface to system memory 220, may be incorporated directly into processor 210.

Network interface 240 may be configured to allow data to be exchanged between computing device 200 and other device or devices 260 attached to a network or network(s) 250, such as other computer systems or devices as illustrated in FIGS. 1 through 7, for example. In various embodiments, network interface 240 may support communication via any suitable wired or wireless general data networks, such as types of Ethernet networks, for example. Additionally, network interface 240 may support communication via telecommunications/telephony networks such as analog voice networks or digital fiber communications networks, via storage area networks such as Fibre Channel SANs, cellular voice and/or data networks, or via any other suitable type of network and/or protocol. When a network interface 240 provides cellular communication its operation may be supported by a credential device 280 that may provide authentication, authorization, and other related information and services.

In some embodiments, system memory 220 may be one embodiment of a computer-accessible medium configured to store program instructions and data as described herein for FIGS. 1-7 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 200 via I/O interface 230. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 200 as system memory 220 or another type of memory. Portions or all of multiple computing devices, such as those illustrated in FIG. 2, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

Figure 3:
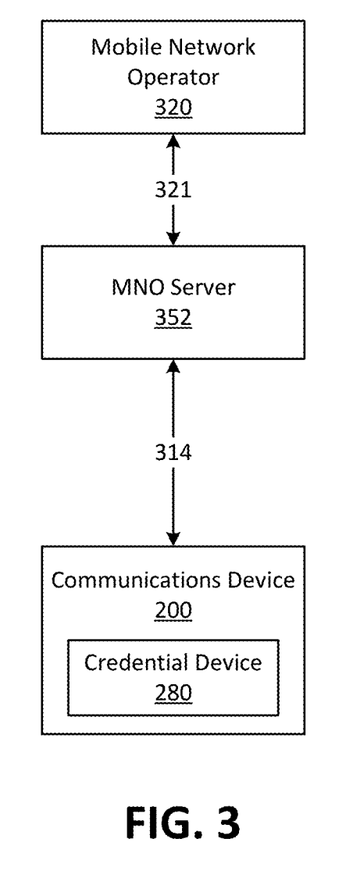
FIG. 3 depicts an example environment for provisioning of mobile devices.

The communications devices as used herein may refer to devices including, but not limited to, smartphones, cellular-enabled tablets and laptops, companion devices (e.g., smart watches), and non-consumer devices (telematics device in an automobile, cellular-connected utility meters, any of which may include some number of credential device(s) 280), and the like. With reference to FIG. 3, credential device 280 such as a UICC or eUICC may be included in the communications device 200 to ensure the integrity and security of personal data and enables communications with mobile communications providers. Such a communications device 200 may embody aspects of the computing device depicted in FIG. 2, and in some embodiments may incorporate one or more network interfaces 240 that communicates over a cellular network.

The 3rd Generation Partnership Project (3GPP) has defined specifications for communications devices covering technologies such as Global System for Mobile Communications (GSM), Universal Mobile Telecommunications System (UMTS), and Long-Term Evolution (LTE). The 3rd Generation Partnership Project 2 (3GPP2) has defined other specifications including Code Division Multiple Access (CDMA). For communications devices complying with these 3GPP or 3GPP2 specifications, their associated credentials are typically embedded in a SIM card. A SIM card may be a removable physical smart card conforming to UICC specification ETSI TS 102 221. The SIM card may be installed when the communications device is manufactured or at the point of sale. Alternatively, a SIM card may be purchased from the mobile operator for use with a communications device that is obtained separately and that has a physical slot conforming to the UICC specification.

Credentials for accessing a communications service provided by MNO 320 may include both data and instructions. When the instructions are executed on a processor, such as the processor of credential device 280 within a mobile communications device 200, the instructions may be configured to cause communication between the processor and a communications service server such that the communications service server may authenticate the credentials and enable the communications services. A set of credentials may be associated with a subscription for communications services from a particular communication service provider. Multiple sets of credentials may be provided for multiple subscriptions.

An eUICC may enable the service subscription used by the communications device to be securely reconfigured without physically adding or removing the eUICC from the communications device. An eUICC may hold one or multiple eUICC profiles, with one being typically active at one time. An eUICC profile, as used herein, generally refers to the client information associated with a network subscription, and embodiments are not limited to any particular eUICC system. A eUICC profile, may include a combination of file structure, data, and applications associated with the service credentials provisioned onto a credential device and which enable the communications device to use the subscription services associated with that profile.

For example, the GSM Association (GSMA) has defined an architecture for remote provisioning of a communications device for subscription services without physically swapping SIM cards for machine-to-machine scenarios by using a eUICC. Some automobile telematics systems are examples of systems that use eUICC devices.

FIG. 3 depicts one example environment for provisioning of profiles. A MNO 320 may own or otherwise control one or more MNO servers 352 through an interface 321. MNO servers may include an SM-DP+. A communications device, also known as User Equipment (UE) 200 may, for example, be a mobile communications device containing a credential device 280. The credential device 280 may refer to a physically removable device containing electronic credentials, such as a removable eUICC, or a non-removable device that can be electronically provisioned with subscription credentials, such as a soldered eUICC, or the like. The credential device 280 may also refer to a software container that can contain one or more e-profiles and that can be electronically provisioned with subscription credentials in accordance with some embodiments.

Once provisioned with credentials on a credential device 280, UE 200 may be configured to use the provisioned credentials to access MNO subscription services via network connection 314. Network connection 314 may also enable UE 200 to access enterprise services or resources. Network connection 314 may be any type of computer network connection, including wired, WiFi, a cellular data connection, and the like.

In some embodiments, the credential device 280 may be a removable or non-removable eUICC which may be provided by MNO 320 or other manufacturer.

Figure 4:
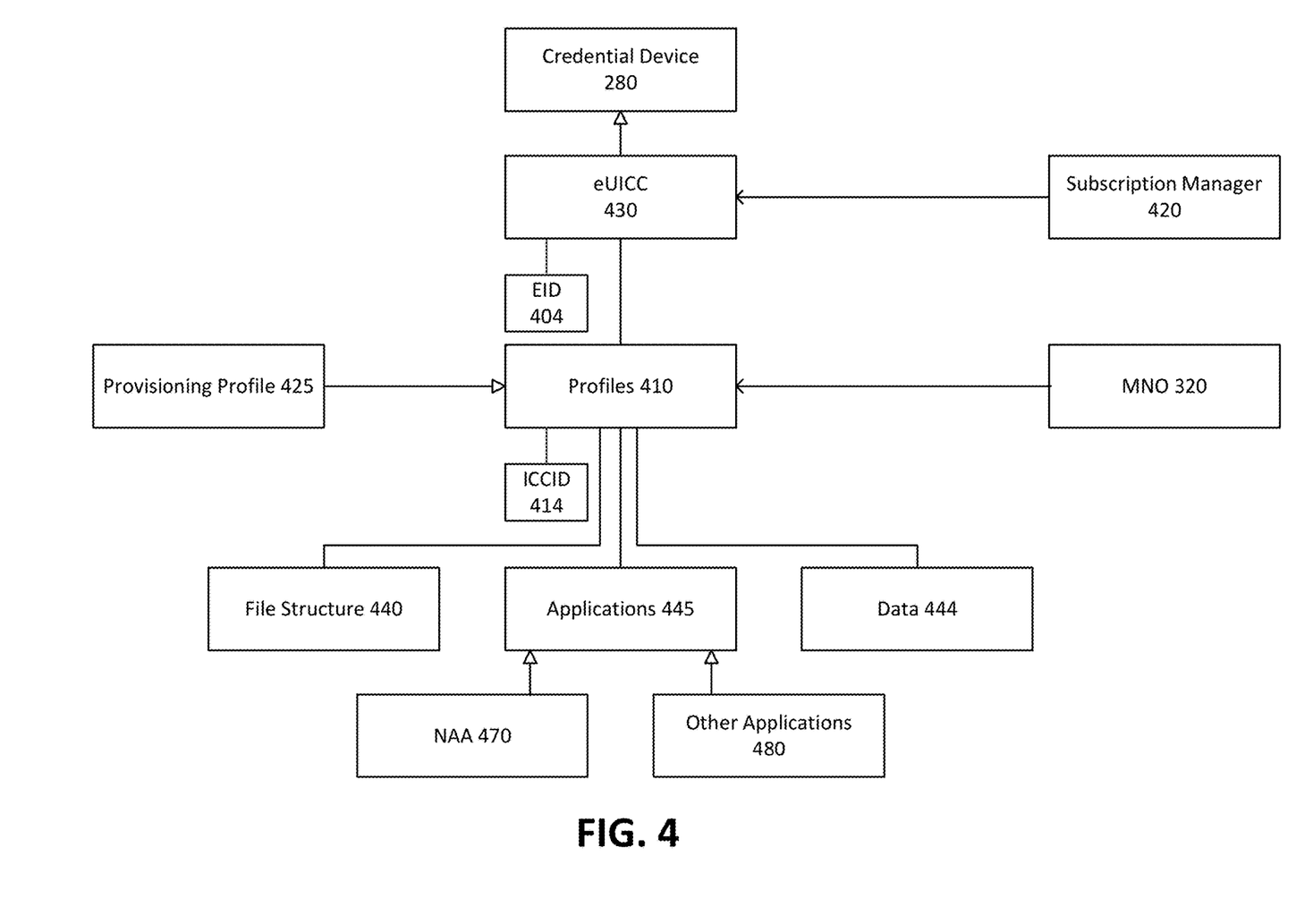
FIG. 4 depicts an example system for provisioning of mobile devices.

FIG. 4 depicts an example logical structure for a credential device 280 that may include a eUICC 430 containing profiles 410. Each profile may have a globally unique identifier referred to as ICCID 414. In some embodiments, eUICC 430 may be identified by a globally unique value referred to as the eUICC-ID or EID 404.

A credential device 280 may be implemented by an eUICC 430, which may be one embodiment of the credential device 280 of FIG. 3. A physical UICC may be another embodiment. As depicted in FIG. 4, the subscription manager 420 may communicate with the credential device 280 (such as eUICC 430).

At least one of the profiles 410 contained in the eUICC 430 may be used to provide connectivity to the subscription manager 420 for profile management. This profile may be designated as a provisioning profile 425.

In an embodiment, the described techniques for using a peered device to access provisioning information (such as an activation code) may be implemented in an enterprise setting where an enterprise may have allocated a plurality of subscriptions, and one of the subscriptions may be allocated to a given device that is eSIM-capable and that has not been previously provisioned for a mobile network subscription. For the purposes of illustration, the eSIM-capable device may be referred to as the candidate device.

When the candidate device does not have access to Wifi or other means of network connectivity besides the mobile network, then the device will not have access to the Internet to download its allocated profile. In one embodiment, the candidate device may form a direct connection to a device that is known to the enterprise and trusted by the enterprise and which is provisioned so that it can communicate on the Internet. The direct connection can be, for example, a peer-to-peer connection between the candidate device and the trusted device, which may be configured to access the mobile network via its own provisioning profile. For example, the trusted device may be a device that is owned and operated by the enterprise, or is otherwise configured so that it is trusted by the enterprise. The known device may be referred to herein as the bridge device or gateway device. The bridge device may be a smartphone, a laptop, or any other bridge capable device that has some trusted relationship with the enterprise. The bridge device may be, for example, domain enrolled by the enterprise and enabled to securely access the domain as well as establish a trusted link with the candidate device.

The described embodiments may be implemented in other contexts. For example, the described techniques may be used to allow a headless IoT device to access a mobile network and obtain subscription credentials using a device that is already communicating on the network.

In one example use case, a user of a candidate device may turn on the device, which may initiate an activation process. The candidate device, since it is an enterprise device, may be configured with functionality that searches for a proximate bridge device. The bridge device similarly may be configured with functionality that may search for a candidate device. The candidate device may further be configured with a unique device identifier. The bridge device may be configured with an application that can read the device identifier and communicate with the enterprise to establish a line of communication that can be used by the candidate device.

The candidate device may use a number of ways to uniquely identify itself and can be used by the enterprise to directly or indirectly map and identify the device and determine a subscription profile either by the enterprise or using an OEM lookup. For example, the candidate device may use its EID, IMEI, eUICC, or some combination. Any means to identify the device to the enterprise and securely associate the device with the bridge device may be used.

The application on the bridge device that enables the described functionality may be an application provided by the enterprise or a third-party application that is customized for the enterprise. The application may be configured to facilitate a direct connection between the bridge device and the candidate device, and to ultimately allow the candidate device to directly communicate to the enterprise and establish a communication session with the enterprise. The communication session may then be used to communicate to the Internet and allow the candidate device to access and obtain its own subscription credentials.

In an embodiment, the provisioning of the candidate device may include identifying the candidate device to the enterprise so that the enterprise may map the device according to the device's planned subscription information. In an embodiment, an activation mechanism such as an activation token may be provided to the candidate device. The candidate device may use the activation token to obtain its SIM profile from the MNO.

The described embodiments may be advantageous in scenarios where an enterprise implements an automatic configuration flow, where a device that has connectivity can be enrolled by the enterprise and the enterprise images can be pushed out to the device to comply with enterprise policies and requirements. The embodiments described herein may allow for the automatic configuration flow to be implemented when there is no connectivity for the candidate device that is also eSIM capable.

The enterprise may recognize the arrival of the new candidate device using the serial number, IMEI, or other identifier that identifies the device. The enterprise may arrange for the identification information for the eSIM profile (the address of the download server and an associated token) to be delivered to the device. A communication path to the candidate device may be established through the bridge device, and the established communication path may be used to communicate to the network server/operator to obtain the eSIM information for the candidate device.

In some embodiments, the enterprise may prearrange the subscription information with the network operator so that enterprise devices can be pre-authorized to obtain subscription credentials form the network operator. The enterprise can send information to the candidate device that indicates which network operator will provide subscription credentials. The network operator may provide the subscription credentials when the candidate device provides identification information.

In some embodiments, the identifier for the candidate device can be a class identifier which can indicate a class of device that is authorized to obtain subscription credentials associated with the enterprise. The network provide may provide the next available subscription, The candidate device may use a variety of methods to establish a peer connection to the bridge device, including but not limited to Bluetooth, Wifi, NFC, and other peering technologies. In one embodiment, the candidate device may expose a QR code that can be read by the bridge device. Once the candidate device is identified and authenticated, the bridge device may establish a communication session to the enterprise using, for example, VPN or other means of establishing a data channel. The communication session may be configured to pass through IP-based traffic that can be initiated by the candidate device. Since the bridge device is trusted, the enterprise may rely upon the bridge device to establish a trusted peer connection to the candidate device and receive IP traffic from the candidate device via the bridge device. The enterprise may not be aware of or recognize the candidate device, but the enterprise may receive data from the candidate device by virtue of its trust in the bridge device.

In some embodiments, the enterprise may implement profile identifiers and when a valid profile identifier has been received, the enterprise may provide the next available profile to the candidate device. In other embodiments, the enterprise may communicate with the MNO to request that the MNO provide the candidate device directly with subscription credentials.

In some embodiments, the bridge device may be configured to connect to multiple candidate devices in parallel and allow the multiple candidate devices to be identified and communicate with the enterprise.

Figure 5:
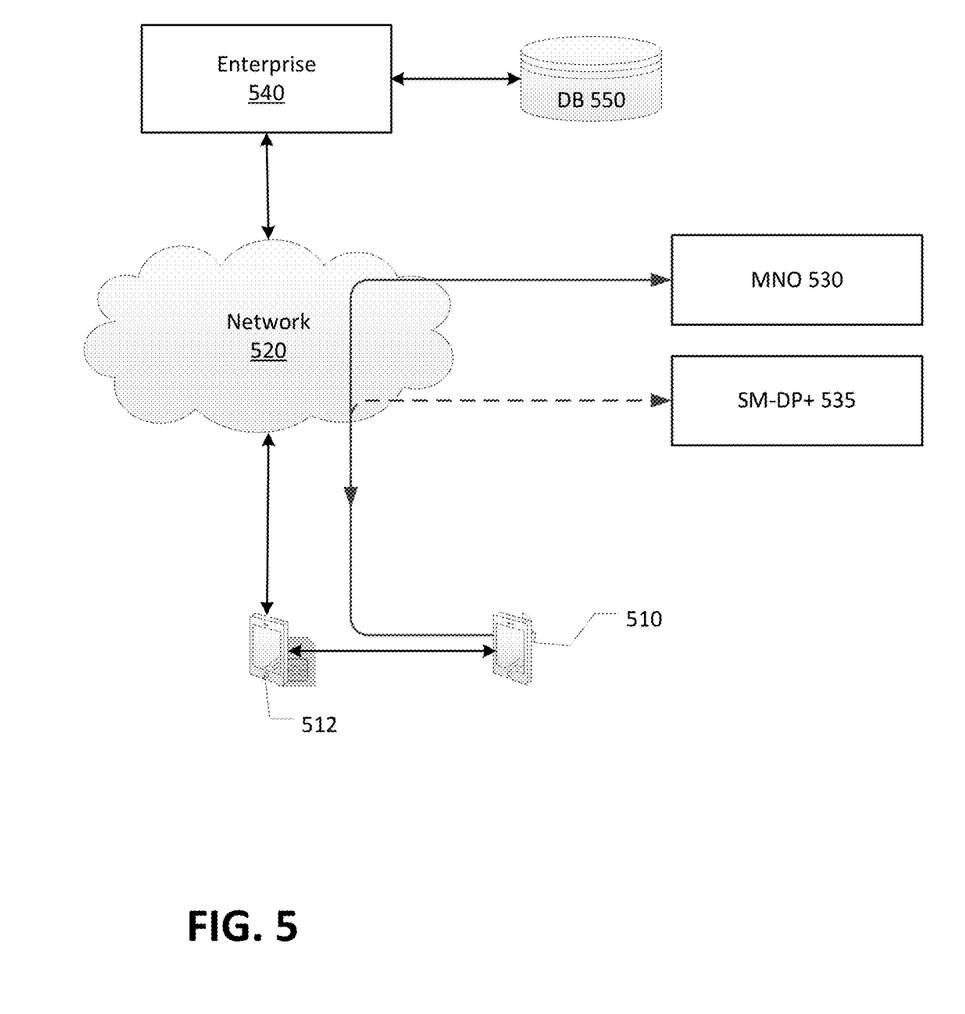
FIG. 5 depicts an example system for provisioning of mobile devices.

Referring to FIG. 5, according to an embodiment of the present disclosure, candidate device 510 may form a peer to peer connection with bridge device 512. Device unique information for a candidate device 510 (for example, the IMEI or serial number) may be obtained from the candidate device 510. Bridge device may send the device unique information to enterprise 540 via network 520. The database 550 may store and manage a database of device unique information that are managed by enterprise 540. The database 550 may include SIM related information that is mapped to device unique information. Enterprise 540 may verify that the device unique information is associated with an enterprise device and obtain the subscription information (e.g., server address and associated token) for the device. Enterprise 540 may send this information to the candidate device 510 via the bridge device 512, which may then allow the candidate device 510 to access network 520. Candidate device 510 may then communicate to MNO 530 via the bridge device 512 to obtain its subscription credentials.

In another embodiment, the bridge device 512 may send data to candidate device 510 that is indicative of the domain name of the SM-DP+ server 535 of the mobile operator used by the enterprise. The enterprise 540 may configure the SM-DP+ server name as part of its management of the bridge device 512. The candidate device 510 may then connect (via bridge device 512) to the SM-DP+ server 535 specified by the SM-DP+ server name to obtain its eSIM profile.

Figure 6:
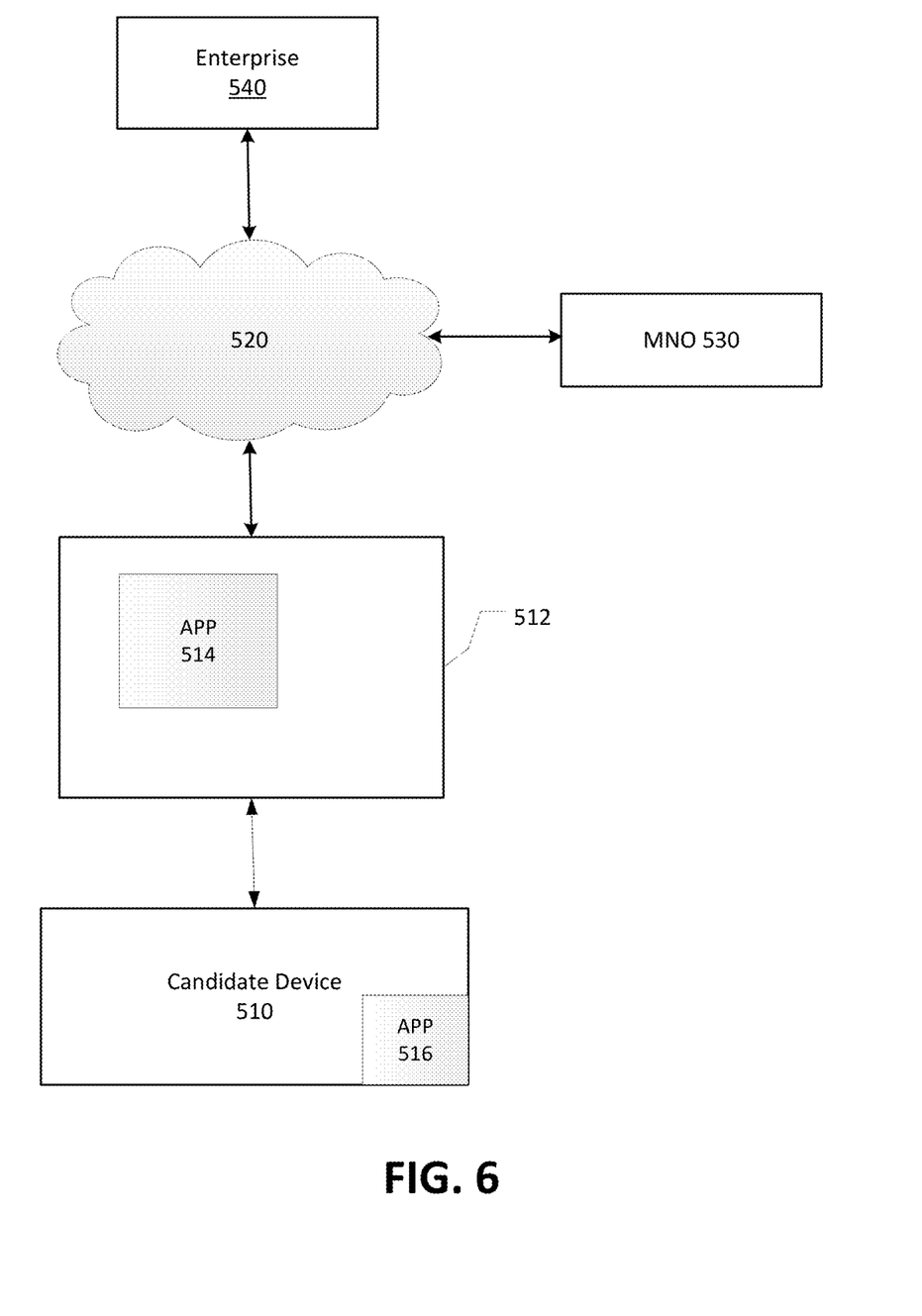
FIG. 6 depicts an example device configured to store identification information.

Referring to FIG. 6, according to an embodiment of the present disclosure, device unique information (for example, the EID) may be obtained for the candidate device 510 by an application 514 executing on bridge device 512. The application 514 may be installed on devices managed by enterprise 540 and configured to search for a proximate candidate device. The candidate device 510 may have an application 516 that is configured to searches for a proximate bridge device. In some embodiments, the applications 514 and 516 may be the same application that implements various functionality depending on whether the host device is a candidate device or a bridge device.

Figure 7:
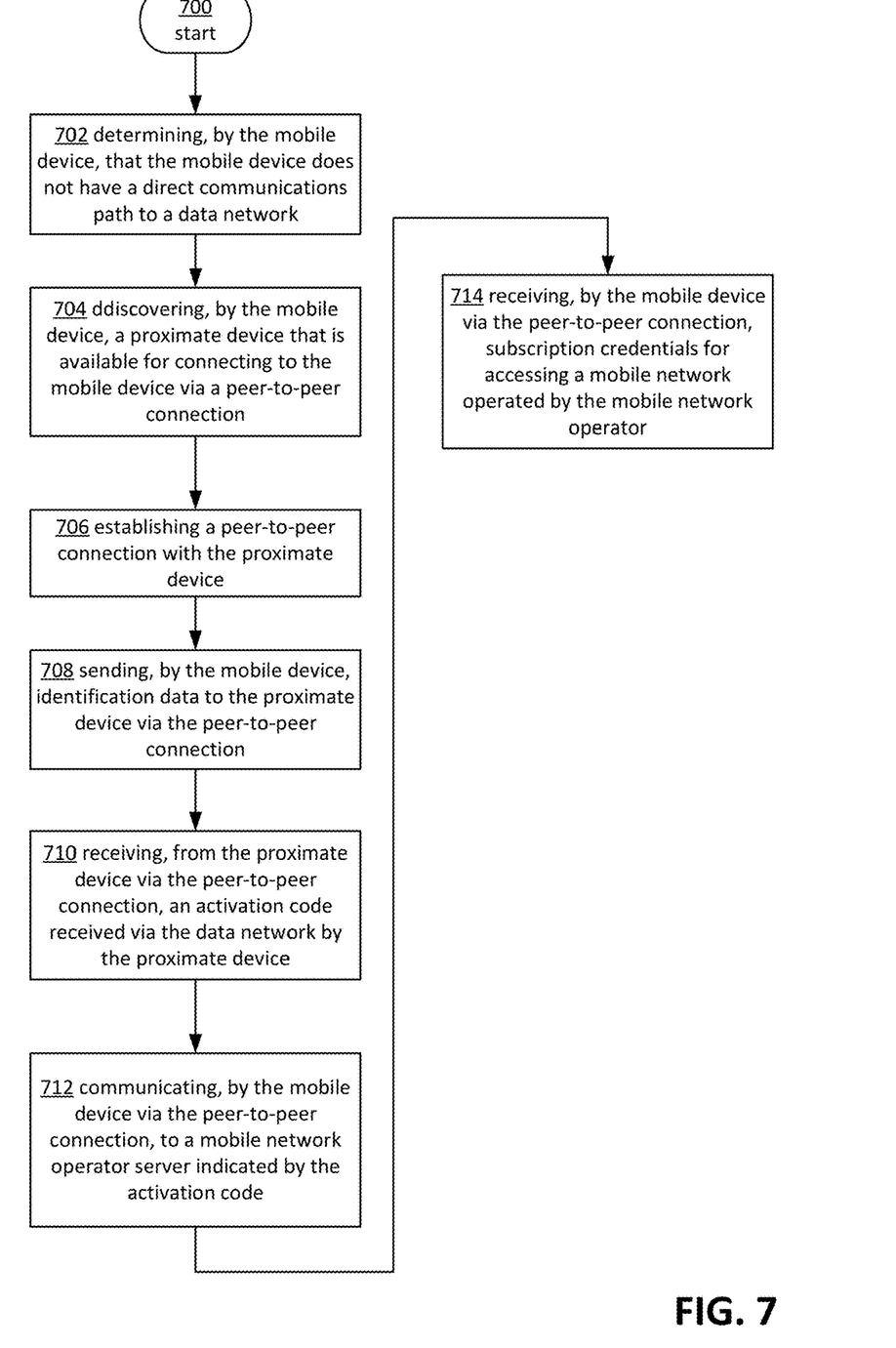
FIG. 7 depicts an operational procedure for provisioning of mobile devices.

FIG. 7 illustrates an example operational procedure for one embodiment of provisioning a mobile device in accordance with this disclosure. In an embodiment, the operational procedure may be implemented in a computing device. The computing device may have a memory that has stored thereon computer-executable instructions that, when executed, cause the computing device to perform operations as described. Referring to FIG. 7, operation 700 begins the operational procedure. Operation 700 may be followed by operation 702. Operation 702 illustrates determining, by the mobile device, that the mobile device does not have a direct communications path to a data network.

Operation 702 may be followed by operation 704. Operation 704 illustrates discovering, by the mobile device, a proximate device that is available for connecting to the mobile device via a peer-to-peer connection, wherein the proximate device is determined to be trusted by the mobile device and usable to communicate to the data network. Operation 704 may be followed by operation 706. Operation 706 illustrates establishing a peer-to-peer connection with the proximate device. Operation 706 may be followed by operation 708. Operation 708 illustrates sending, by the mobile device, identification data to the proximate device via the peer-to-peer connection, wherein the identification data is for an embedded Universal Integrated Circuit Card (eUICC) installed on the mobile device. Operation 708 may be followed by operation 710. Operation 710 illustrates receiving, from the proximate device via the peer-to-peer connection, an activation code received via the data network by the proximate device. Operation 710 may be followed by operation 712. Operation 712 illustrates communicating, by the mobile device via the peer-to-peer connection, to a mobile network operator server indicated by the activation code. Operation 712 may be followed by operation 714. Operation 714 illustrates receiving, by the mobile device via the peer-to-peer connection, subscription credentials for accessing a mobile network operated by the mobile network operator, the subscription credentials provided based in part on the activation code.

Figure 8:
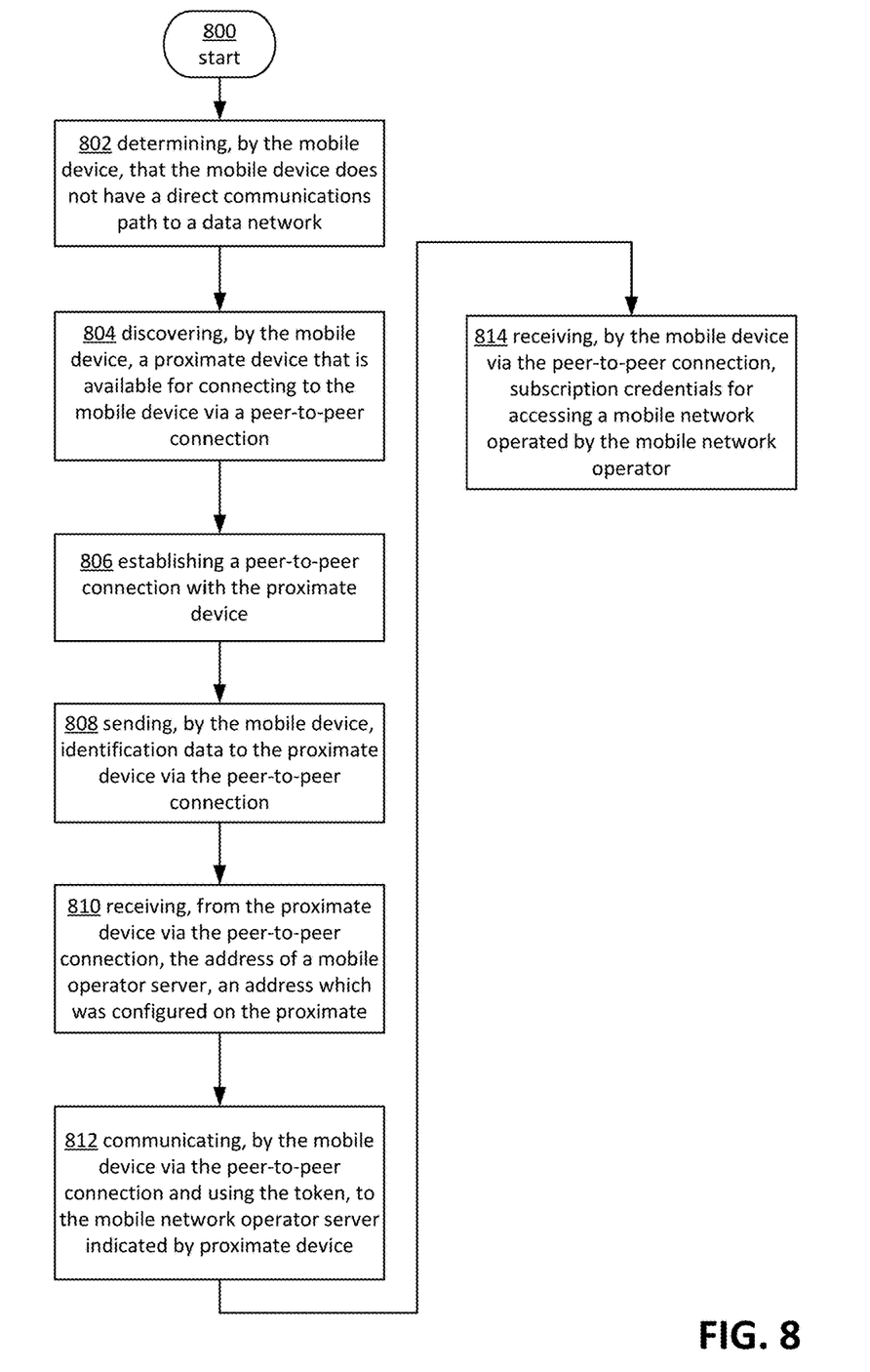
FIG. 8 depicts an operational procedure for provisioning of mobile devices.

FIG. 8 illustrates an example operational procedure for another embodiment of provisioning a mobile device in accordance with this disclosure. In an embodiment, the operational procedure may be implemented in a computing device. The computing device may have a memory that has stored thereon computer-executable instructions that, when executed, cause the computing device to perform operations as described. Referring to FIG. 8, operation 800 begins the operational procedure. Operation 800 may be followed by operation 802. Operation 802 illustrates determining, by the mobile device, that the mobile device does not have a direct communications path to a data network.

Operation 802 may be followed by operation 804. Operation 804 illustrates discovering, by the mobile device, a proximate device that is available for connecting to the mobile device via a peer-to-peer connection, wherein the second device is determined to be trusted by the mobile device and usable to communicate to the data network. Operation 804 may be followed by operation 806. Operation 806 illustrates establishing a peer-to-peer connection with the proximate device. Operation 806 may be followed by operation 808. Operation 808 illustrates sending, by the mobile device, identification data to the proximate device via the peer-to-peer connection, wherein the identification data is for an embedded Universal Integrated Circuit Card (eUICC) installed on the mobile device. Operation 808 may be followed by operation 810. Operation 810 illustrates receiving, from the proximate device via the peer-to-peer connection, the address of a mobile operator server, an address which was configured on the proximate. Operation 810 may be followed by operation 812. Operation 812 illustrates communicating, by the mobile device via the peer-to-peer connection and using the token, to the mobile network operator server indicated by proximate device. Operation 812 may be followed by operation 814. Operation 814 illustrates receiving, by the mobile device via the peer-to-peer connection, subscription credentials for accessing a mobile network operated by the mobile network operator.

Example Clauses

The disclosure presented herein may be considered in view of the following clauses.

Example Clause A, a method of provisioning a mobile device configured to communicate on a mobile communications network operated by a mobile network operator, the method comprising:
  determining, by the mobile device, that the mobile device does not have a direct communications path to a data network;
  discovering, by the mobile device, a proximate device that is available for connecting to the mobile device via a peer-to-peer connection, wherein the proximate device is determined to be trusted by the mobile device and usable to communicate to the data network;
  establishing a peer-to-peer connection with the proximate device;
  sending, by the mobile device, identification data to the proximate device via the peer-to-peer connection, wherein the identification data is for an embedded Universal Integrated Circuit Card (eUICC) installed on the mobile device;
  receiving, from the proximate device via the peer-to-peer connection, an activation code received via the data network by the proximate device;
  communicating, by the mobile device via the peer-to-peer connection, to a mobile network operator server indicated by the activation code; and
  receiving, by the mobile device via the peer-to-peer connection, subscription credentials for accessing a mobile network operated by the mobile network operator, the subscription credentials provided based in part on the activation code.

Example Clause B, the method of Example Clause A, wherein the proximate device is one of a smartphone, laptop, tablet, or an Internet of Things (IoT) device.

Example Clause C, the method of any one of Example Clauses A through B, wherein the proximate device executes an application authorized by an enterprise to at least verify the identification data of the mobile device and communicate with the enterprise.

Example Clause D, the method of any one of Example Clauses A through C, wherein the identification data is represented as a QR code.

Example Clause E, the method of any one of Example Clauses A through D, wherein the enterprise enrolls and manages the mobile device and the proximate device.

Example Clause F, the method of any one of Example Clauses A through E, wherein the proximate device is a device of an Internet of Things (IoT) network of devices that includes the mobile device and the proximate device.

Example Clause G, the method of any one of Example Clauses A through F, wherein the activation code was received by the proximate device prior to the establishing the peer-to-peer connection with the proximate device.

Example Clause H, the method of any one of Example Clauses A through G, wherein the activation code includes a location of a SM-DP+.

Example Clause I, the method of any one of Example Clauses A through H, wherein the activation code identifies a SIM profile to be obtained from the mobile network operator.

Example Clause J, the method of any one of Example Clauses A through I, wherein the identification data is one of a serial number or IMEI Example Clause K, the method of any one of Example Clauses A through J, wherein the mobile device executes an application authorized by the enterprise and configured to discover the proximate device and send the unique identification data to the proximate device Example Clause L, the method of any one of Example Clauses A through K, wherein the peer-to-peer connection enables a pass-through of data packets from the mobile device to the mobile network operator via the Internet Example Clause M, the method of any one of Example Clauses A through L, wherein the identification data is verified by the enterprise and determined to be authorized by the enterprise to receive subscription credentials from the mobile network operator Example Clause N, a computing device comprising:
  a memory storing thereon instructions that when executed by a processor of the computing device, cause the computing device to perform operations comprising:
  discovering a mobile device that is available for a peer-to-peer connection;
  establishing the peer-to-peer communications session with the mobile device;
  receiving identification data from the mobile device via the peer-to-peer connection;
  sending the identification data to a third device;
  receiving, from the third device, an activation code;
  sending, to the mobile device via the peer-to-peer connection, the activation code;
  receiving, from the mobile device via the peer-to-peer connection, data traffic addressed to a mobile network operator indicated by the activation code over a data network accessible by the computing device; and
  sending the received data traffic to the mobile network operator over the data network.

Example Clause O, the computing device of Example Clause N, wherein the activation code includes a token usable to obtain a SIM profile from the mobile network operator.

Example Clause P, the computing device of any one of Example Clauses N through O, further comprising receiving response data from the mobile network operator and passing the response data to the proximate device via the peer-to-peer communications session. Example Clause Q, the computing device of any one of Example Clauses N through P, further comprising:
  establishing peer-to-peer communications sessions with a plurality of mobile devices;
  sending identification data for the plurality of mobile devices to the third device;
  receiving, from the third device, activation codes for the plurality of mobile devices;
  sending, to the plurality of mobile devices, the activation codes for the plurality of mobile devices;

receiving, from the plurality of mobile devices, data traffic addressed to the mobile network operator indicated by the activation code; and sending the received data traffic to the plurality of mobile devices.

Example Clause R, a server configured to communicate with one or more devices, the server configured to:

receive, from a first device, identification data for a second device, wherein the identification data is received by the first device from the second device over a peer-to-peer network, and wherein the second device is not provisioned for mobile network access;

determine that the first and second devices are trusted by the server;

access an activation code associated with the second device, wherein the activation code is usable by the second device to request subscription credentials from a mobile network operator indicated by the activation code; and send, to the first device, the activation code, wherein the activation code is sent to the second device by the first device over the peer-to-peer connection.

Example Clause S, the server of Example Clause R, wherein the determining is performed based on accessing a database of managed devices and associated subscription information.

Example Clause T, the server of any of Example Clauses R through S, wherein the mobile network operator is pre-authorized to provide subscription credentials to the second device.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of provisioning a mobile device configured to communicate on a mobile network operated by a mobile network operator, the method comprising:

discovering, by the mobile device, a proximate device that is available for connecting to the mobile device via a peer-to-peer connection, wherein the proximate device is usable to communicate to a data network;

establishing the peer-to-peer connection with the proximate device;

sending, by the mobile device, identification data to the proximate device via the peer-to-peer connection, wherein the identification data is for an embedded Universal Integrated Circuit Card (eUICC) installed on the mobile device;

receiving, from the proximate device via the peer-to-peer connection, an activation code including an indication of a server of the mobile network; and receiving, by the mobile device from the server of the mobile network operator indicated by the activation code, subscription credentials for accessing the mobile network operated by the mobile network operator, the subscription credentials provided based in part on the activation code.

2. The method of claim 1, wherein the proximate device is one of a smartphone, laptop, tablet, or an Internet of Things (IoT) device.

3. The method of claim 1, wherein the proximate device executes an application to at least verify the identification data of the mobile device.

4. The method of claim 1, wherein the identification data is represented as a QR code.

5. The method of claim 1, wherein the proximate device is a device of an Internet of Things (IoT) network of devices that includes the mobile device and the proximate device.

6. The method of claim 1, wherein the activation code was received by the proximate device prior to the establishing the peer-to-peer connection with the proximate device.

7. The method of claim 1, wherein the activation code includes a location of a Subscription Manager-Data Preparation+ (SM-DP+).

8. The method of claim 1, wherein the activation code identifies a SIM profile to be obtained from the mobile network operator.

9. The method of claim 1, wherein the identification data is one of a serial number or IMEI.

10. The method of claim 3, wherein the mobile device executes an application configured to discover the proximate device and send the identification data to the proximate device.

11. The method of claim 1, wherein the peer-to-peer connection enables a pass-through of data packets from the mobile device to the mobile network operator via the Internet.

12. A computing device comprising:
a memory storing thereon instructions that when executed by a processor of the computing device, cause the computing device to perform operations comprising:
discovering a mobile device that is available for a peer-to-peer connection;
establishing the peer-to-peer connection with the mobile device;
receiving identification data from the mobile device via the peer-to-peer connection;
sending the identification data to a third device;
receiving, from the third device, an activation code including an indication of a server of a mobile network; and
sending, to the mobile device via the peer-to-peer connection, the activation code, wherein the activation code is indicative of a server of the mobile network operated by a mobile network operator from which the mobile device can receive subscription credentials for accessing the mobile network operated by the mobile network operator, the subscription credentials accessible based in part on the activation code.

13. The computing device of claim 12, wherein the activation code includes a token usable to obtain a SIM profile from a mobile network operator.

14. The computing device of claim 12, further comprising receiving response data from a mobile network operator and passing the response data to the mobile device via the peer-to-peer connection.

15. The computing device of claim 14, further comprising:
establishing peer-to-peer connections with a plurality of mobile devices;
sending identification data for the plurality of mobile devices to the third device;
receiving, from the third device, activation codes for the plurality of mobile devices; and
sending, to the plurality of mobile devices, the activation codes for the plurality of mobile devices.

16. A server configured to communicate with one or more devices, the server configured to:
receive, from a first device, identification data for a second device, wherein the identification data is received by the first device from the second device over a peer-to-peer connection, and wherein the second device is not provisioned for mobile network access;
determine that the first and second devices are trusted by the server;
access an activation code associated with the second device, wherein the activation code includes an indication of a server of a mobile network operated by a mobile network operator and is usable by the second device to request subscription credentials from the server of the mobile network operator, wherein the subscription credentials are provided based in part on the activation code; and
send, to the first device, the activation code, wherein the activation code is sent to the second device by the first device over the peer-to-peer connection.

17. The server of claim 16, wherein the determining is performed based on accessing a database of managed devices and associated subscription information.

18. The server of claim 16, wherein the mobile network operator is pre-authorized to provide subscription credentials to the second device.

19. The method of claim 1, wherein the data network is at least one of an Ethernet network, telecommunications network, telephony network, analog voice network, digital fiber communications network, cellular voice network, or cellular data network.

20. The method of claim 1, wherein the data network is the mobile network.

* * * * *